A. F. ZAHM.
WIND TUNNEL BALANCE.
APPLICATION FILED MAY 9, 1919.

1,404,920.

Patented Jan. 31, 1922.
4 SHEETS—SHEET 3.

Inventor
ALBERT F. ZAHM.
By
Attorney Chester H. Buselton

A. F. ZAHM.
WIND TUNNEL BALANCE.
APPLICATION FILED MAY 9, 1919.
1,404,920.
Patented Jan. 31, 1922.
4 SHEETS—SHEET 4.
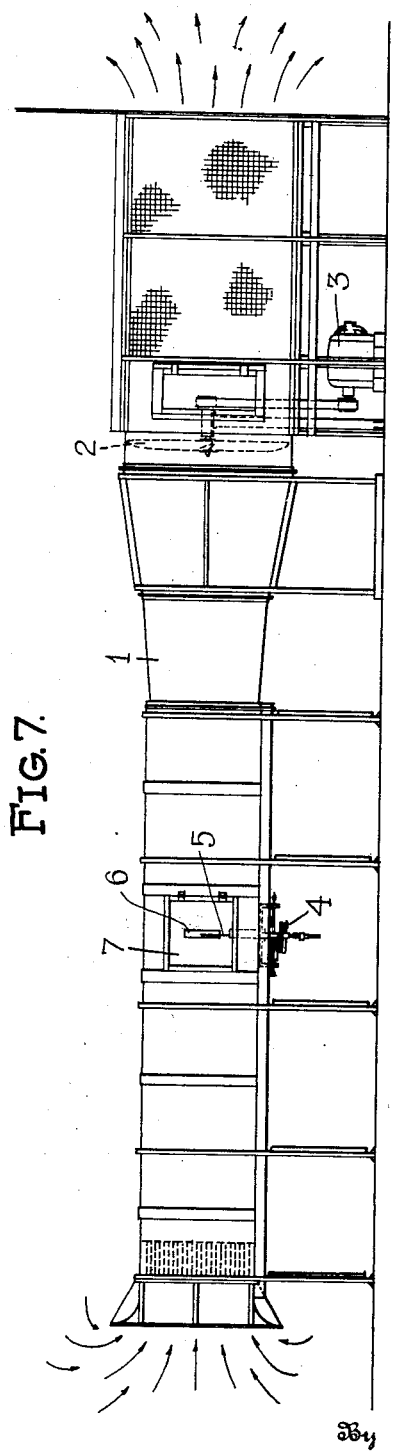
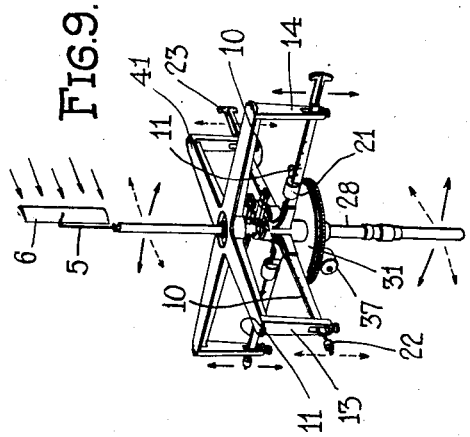
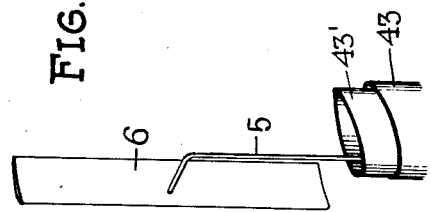
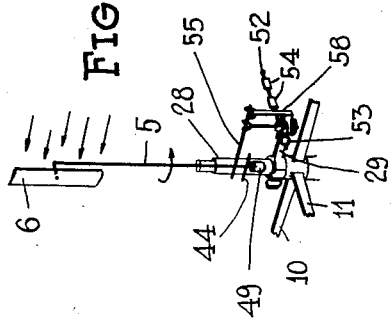
Inventor
ALBERT F. ZAHM.
By
Attorney Chester H Boulton

UNITED STATES PATENT OFFICE.

ALBERT F. ZAHM, OF WASHINGTON, DISTRICT OF COLUMBIA, ASSIGNOR TO CURTISS AEROPLANE AND MOTOR CORPORATION, OF BUFFALO, NEW YORK, A CORPORATION OF NEW YORK.

WIND TUNNEL BALANCE.

1,404,920. Specification of Letters Patent. Patented Jan. 31, 1922.

Application filed May 9, 1919. Serial No. 296,038.

*To all whom it may concern:*

Be it known that I, ALBERT F. ZAHM, a citizen of the United States, residing at Washington, in the District of Columbia, have invented certain new and useful Improvements in Wind Tunnel Balances, of which the following is a specification.

This invention relates to balances for making aerodynamic tests on articles and bodies of various descriptions including struts, aerofoils, fuselages and models of aircraft generally.

The object of the invention is the simplification of balances of this type whereby the component parts thereof may be easily assembled into an operating mechanism and whereby the balance after assembly, may be operated and manipulated with great facility. A further object is a balance which permits the determination of the aerodynamic characteristics of the bodies under test, with rapidity in performance and accuracy in results.

More specifically the improved balance of this application is so constructed and assembled that with a single setting of the body under test the drift, lift and center of pressure characteristics may be determined with the required accuracy for practical purposes without shifting or adjusting the position of the body thereon. In the specific embodiment illustrated in this application the balance consists of four rigidly connected balancing arms disposed at right angles to each other, an aerofoil body support carried by these balance arms, knife edge bearings serving as fulcrums upon which the balance arms may be caused to rest and about which the balance is adapted to oscillate in two directions at right angles to each other, depending upon which of the cross arms is acting as the support, and a means whereby the body support may be oscillatably carried by the balance together with an auxiliary balance connected therewith for determining the rotating torque of the body. The body support on its upper end carries an offset for direct connection to the body under test, the body being preferably carried in a vertical position thereon. By supporting one of the cross arms upon the knife edge bearings and leaving the other arm at right angles thereto free to oscillate to and fro the drift or drag upon the body may be directly measured by the balance, whereas by supporting the other cross arm upon its knife edge bearings, and leaving the first arm free to oscillate the lift may be directly measured. On the other hand, by supporting all of the cross arms upon the knife edges and disconnecting the body support for oscillation about its axis relatively to the main balance, measurements may be determined from which together with the measured lift and drift, the center of pressure may be calculated and determined.

For a better understanding of the improvements of this application reference may be had to the accompanying drawings forming a part thereof, wherein—

Fig. 5 is an enlarged view of the knife edge bearings;

Fig. 6 is a section on the line 6—6 of the Fig. 5;

Fig. 7 is a side view of the wind tunnel and the balance as installed therein;

Fig. 8 is a perspective view of the body support carrying an aerofoil body to be tested;

Fig. 9 is a perspective view of the balance as a whole, and

Fig. 10 is a perspective view of the auxiliary balance.

Figure 1:
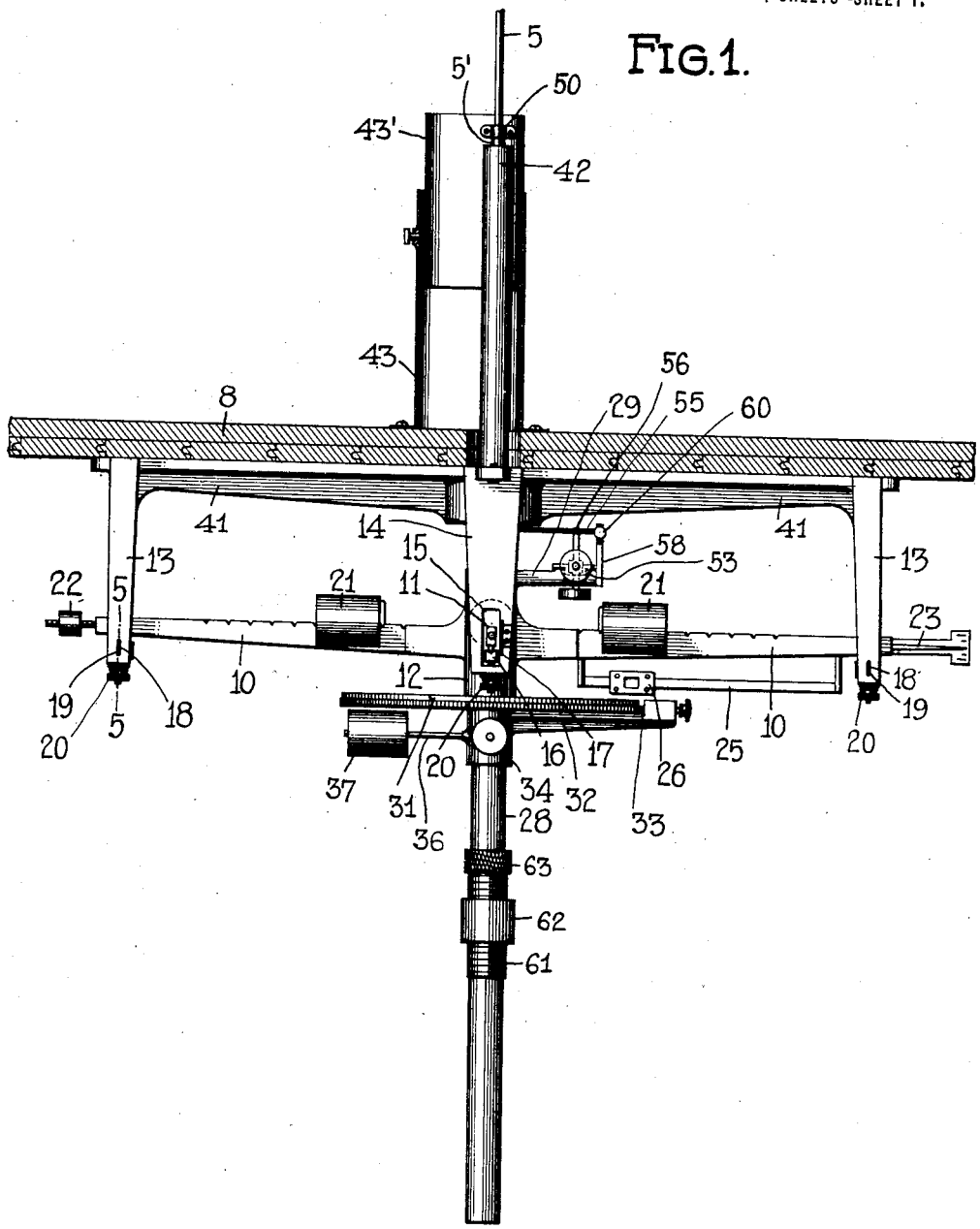
Fig. 1 is a side view of the balance.
Figure 2:
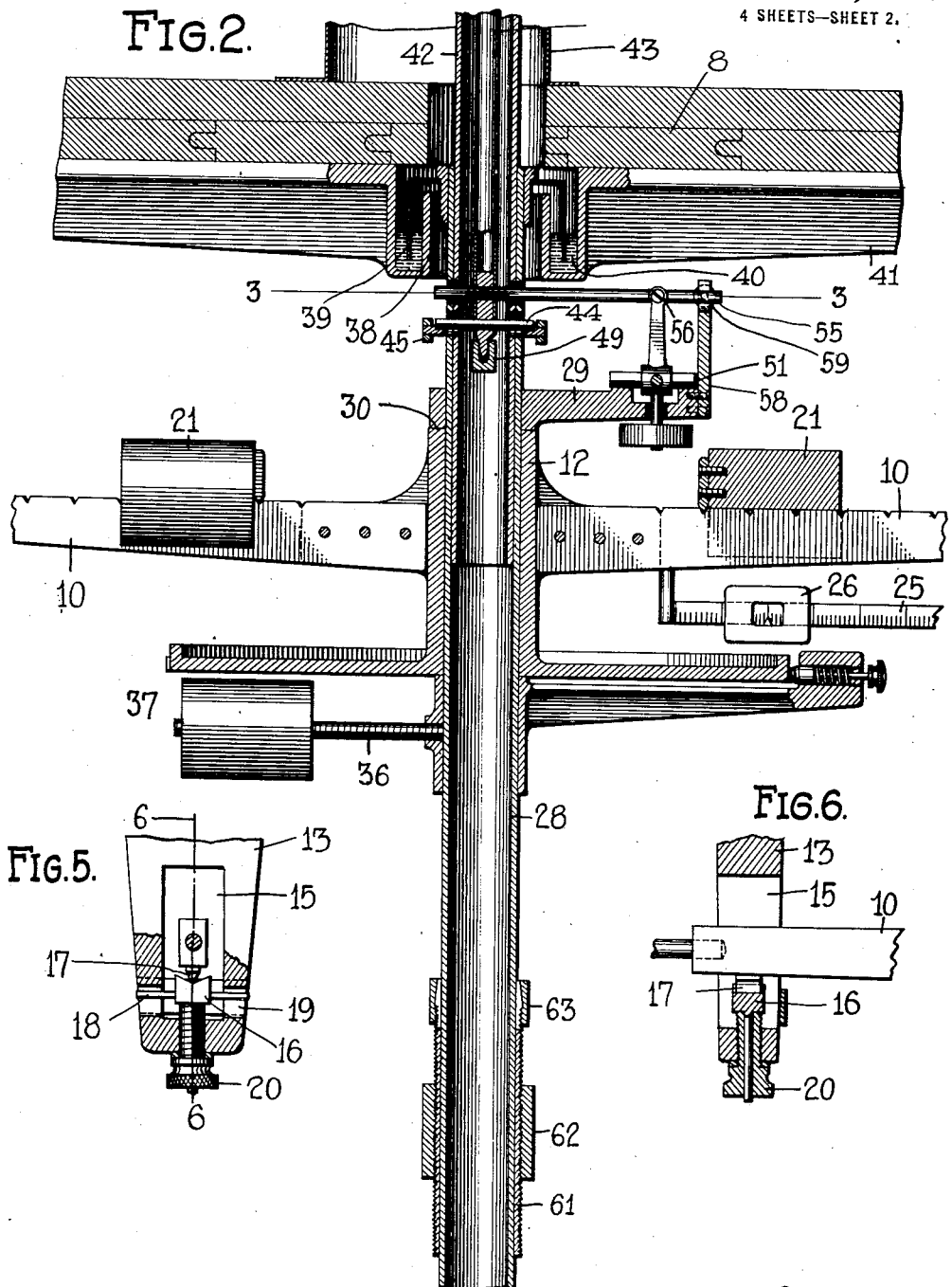
Fig. 2 is a vertical sectional view therethrough.
Figure 3:
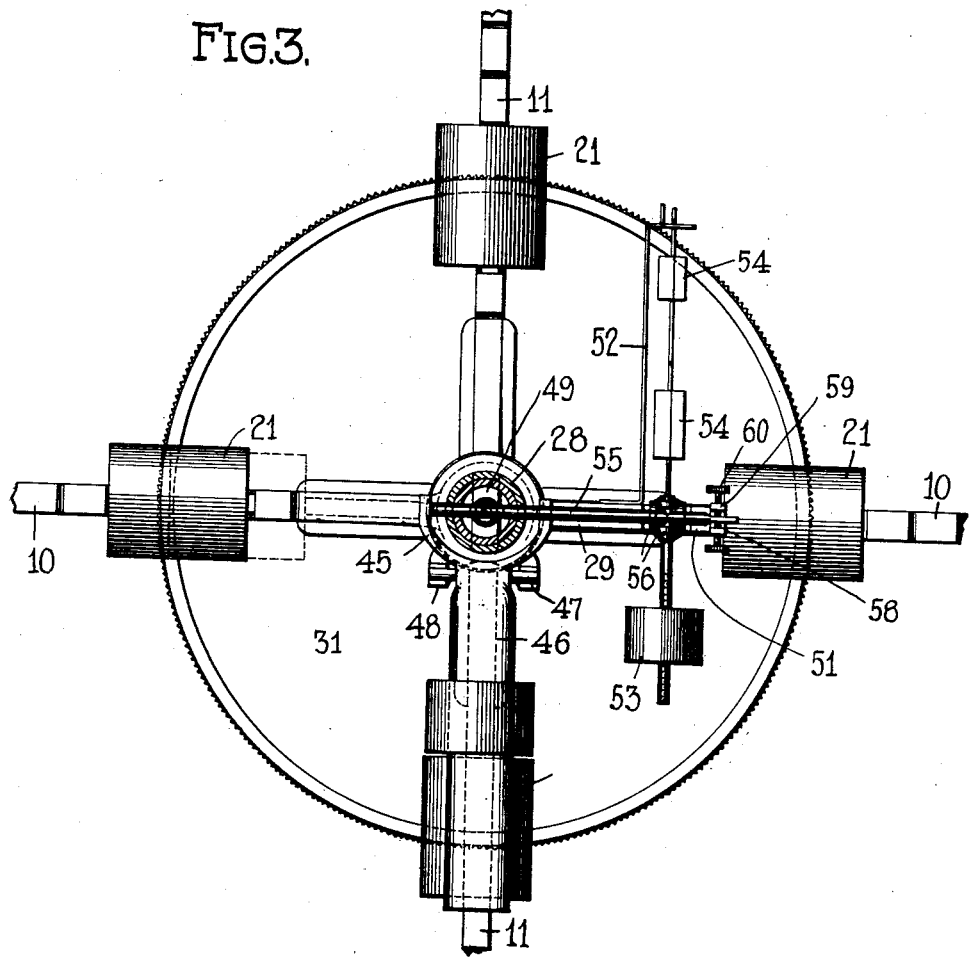
Fig. 3 is a section on the line 3—3 of Fig. 2 looking downwardly upon the main balance.

Referring to the drawings where like numerals designate similar parts throughout, a wind tunnel is indicated at 1 and at one end thereof is disposed a propeller or suction fan 2 for setting up therein a wind speed at the required velocity, the propeller being driven by any suitable power machine, as for instance a motor 3. The improvements in this application reside in the wind tunnel balance designated generally by the numeral 4, this balance carrying on its body support 5 an aerofoil body 6, the latter being disposed in the air stream and being observable through a window 7 provided in the side of the wind tunnel.

The balance is carried in any suitable manner as for instance by the floor 8 of the wind tunnel chamber. The balance comprises four balancing arms 10 and 11, these arms being rigidly connected together as for instance to the bearing sleeve or cylindrical member 12. The arms 10 and 11 are disposed at right angles to each other, the arms 10 forming a continuation of each other and the arms 11 in like manner forming a continuation, whereby these arms may be considered as formed of one piece and crossing each other at right angles and at their center. These balancing arms may be considered as balances or supports depending upon the character of the measurements to be made. The balance as a whole is supported by the floor 8 through the medium of two pairs of hangers 13 and 14, the hangers 13 being adapted to support the balancing arms 10, and the hangers 14 being adapted to support the cross arms 11. For this purpose the hangers are provided at their lower ends with rectangular openings 15 for the reception of the free ends of the cross arms 10 and 11. Each hanger 13—14 is provided with a knife edge bearing 16 for the reception of the knife edges 17 formed on or carried by the free ends of the arms 10 and 11. The knife edge bearings 16 are provided with guide arms 18' which play in slots 19 formed in the lower ends of the hangers 13—14. The vertical position of the bearings 16 is determined by the positions of the set-screws 20 which are threaded into vertical openings provided in the lower ends of the hangers. By this arrangement the bearings 16 may be raised or lowered at the will of the operator and either the arm 10 may be caused to support the balance as a whole by resting upon the knife edge bearings 16 as fulcrums or its bearings may be lowered and the bearing of the arm 11 raised to supporting position as will hereinafter appear. It is desirable in some cases to support both the arms 10 and 11 upon the knife edge bearings for the purpose of making certain tests, this being the position indicated in the drawings. When the balance as a whole is carried by the arms 11 the bearing supports for the arm 10 may be lowered for the purpose of permitting the balance as a whole to oscillate about the arms 11 as an axis and on the knife edge bearings 16 and 17. Each balancing arm is provided with balancing weights for establishing the balance. For instance, the balancing arm 10 has the adjustable weights 21 which may be shifted to the various positions indicated by the notches thereon. This arm also carries a smaller adjusting or counterpoise weight 22 on the left hand thereof. (Fig. 1.) On the right hand end this balancing arm 10 carries a pointer 23 for swinging in proximity to a graduated scale 24. The right hand branch of arm 10 also carries a graduated scale 25 and an adjustable weight 26 for movement back and forth thereon, and by means of these various weights and scales the proper balance may be established and the force upon the body support 5 which carries the aerofoil 6 may be determined. In a similar manner the balance may be supported by the balancing arm and arms 11 used as the balancing members, the arms 10 serving as the axis of oscillation.

The support 5 is carried by the vertical hollow shaft 28 which passes up and through the bearing sleeve 12, this sleeve 28 carrying and having fixed thereto a bracket 29. The bracket 29 is provided with an opening through which passes the sleeve 28 and provided also with a bearing surface 30, for engaging the upper ends of the bearing sleeve 12. The sleeve 28 together with the supports may be adjusted to the required angle for the measurement to be determined by means of a disc 31 integrally formed on the sleeve 12 and on the lower end thereof, this disc being provided with locking teeth or indentations on its periphery for cooperation with a rotary arm 32, this latter arm carrying a thumb actuated dog 33 which engages the teeth on the periphery or disc 31 and securely locks the same in position. The arm 32 is fixed to the shaft 28 in any suitable manner as by means of a sleeve 34 formed integrally therewith and brazed or otherwise fastened to the shaft. The arm 32 carries in alignment therewith and on the opposite side of the shaft 28 an arm 36 which in turn carries an adjustable counterweight 37. By means of this arrangement the arm 32 may be released from the disc 31 by withdrawing the dog 33 and the shaft 28 together with the support 5, and aerofoil 6 may thereby be rotated to the exact position desired for the test.

The shaft 28 extends upwardly in proximity to an opening in the floor 8 and on its upper end carries a shouldered sleeve 38 which in turn carries the annular sealing member 39. The sealing member 39 consists of a shell depending downwardly into an annular chamber formed in the bottom member 41 of the floor 8. By this arrangement the sleeve 38 is securely sealed together with a member 39 against the escapement therethrough of air. The shaft 28 also has fixed thereto and carries therewithin the hollow shaft 42, the latter projecting up into the wind tunnel and around the hollow spindle 5' which carries the support 5. The sleeve or the hollow shaft 42 and the spindle 5' are preferably encased in a stream lined casing 43 which is suitably attached to the bottom floor 8 and surrounds these members.

While the balance arms 10 and 11 are being used for measuring the lift and drift, the spindle 5' and support 5 are rigidly fixed to the hollow shaft 28 to oscillate with the balance. The means for securely fastening the spindle 5' to the sleeve 28 comprises a pintle 44 which passes transversely therethrough and rests upon the forks 45 of a lever 46, the lever 46 being fulcrumed as at 47 upon a pair of standards 48 projecting upwardly from and integrally formed with bracket 29. By lifting up on the long arm of the lever 46 spindle 5' may be lowered for support upon and rotary movement on the bearing 49 which is carried by the hollow shaft 42. When the spindle is thus dropped down it is free to rotate about the pivot bearing 49 at its lower end and also about any suitable bearing at its upper end, as for instance a ball bearing in the upper end of the shaft 42. An extension 43' of the streamline casing surrounds the spindle and is adjustable up and down.

Figure 4:
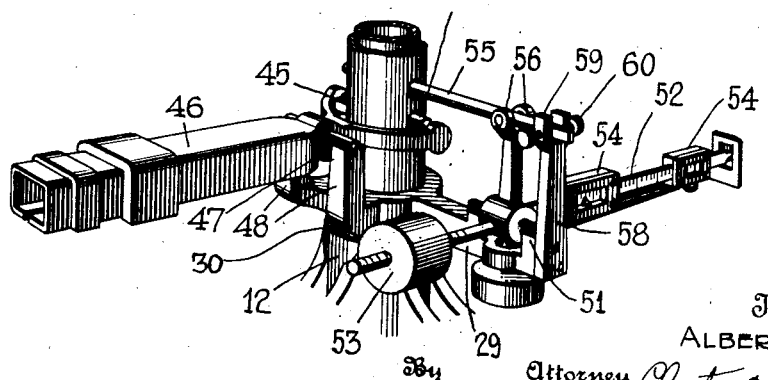
Fig. 4 is a perspective view of the auxiliary balance and its connection with the spindle.

The bracket 29 carries on knife edge bearing 51 a balance arm 52, the latter carrying on its left hand end (Fig. 4) an adjustable counter-balance weight 53, and on its right hand end weights 54 which are adjustable along a graduated scale thereon. The oscillation of the spindle 5' and aerofoil support 5 about its longitudinal axis is transmitted to the balance arm 52 through the medium of a connecting arm 55, the latter passing transversely through openings formed in the hollow shafts 28 and 42 and through the lower end of the spindle 5' as indicated. The free end of this arm 55 plays between the jaws 56 of a vertical arm formed integrally with the balance arm 52 and by the oscillation of the spindle and thereby the arm 55 the balance arm or lever 52 is oscillated about its fulcrum point 51. The bracket arm 29 carries on its outer end an upright member 58, this upright member 58 having a fork formed on the upper end thereof between which plays the free end of the arm 5. The fork 59 is provided with adjusting screws 60 for adjusting the arm 55 between the extensions of the fork 59. The arm 55 and the spindle 5' may also be locked to the bracket 29 through this means. On the lower end of the hollow shaft 28 is disposed an externally threaded sleeve 61 for the reception of a screw threaded weight 62. The sleeve may be fixed in any position by means of the tightening nut 63. By this arrangement the lower end of the shaft 28 may be counterweighted.

Referring to Figures 8 and 9 it is noted that the aerofoil 6 is supported in a vertical position by means of the upper bent arm of the support 5. By locking the balance arms 11 in a fixed position (by raising the supporting bearings therefor) it is clear that the aerofoil 5 is incapable of movement at right angles to its surface and is only capable of movement substantially edgewise to the air stream. Accordingly by balancing the weights etc. upon the balancing arms 10 the resistance, drift or drag of the aerofoil may be determined. On the other hand by locking the arms 10 rigidly in position, and freeing the arms 11, it is noted the aerofoil 5 cannot then partake of edgewise movement but only the lift movement or movement substanially at right angles to its surface and the lift characteristic may thereby be determined. Knowing the lift and drift it is necessary then to determine the center of pressure of the aerofoil or the point where the resultant of these two forces acts. This is done by locking both the arms 10 and 11 in the inactive position whereby both of them serve as a support for the balance and with the arms 10 and 11 thus fixed in position the spindle 5' and support 5 are released to rotate about their longitudinal axis. The balance and adjustment of the balance 52 being then effected, the moment of the aerofoil about the spindle axis may be determined. From the data thus determined the center of pressure of the aerofoil may be calculated and determined. For example, knowing the lift (L) and the drift (D) the resultant (R) may be determined and knowing the direction of the resultant it is only necessary to determine the point on the aerofoil where the resultant acts. This is found by measuring the moment (M) on the balance 52, as above indicated and then calculating the moment arm from the formula $M = R \times X$, where $M$=moment; $R$= resultant of L and D; $X$=moment arm. The position, as well as the direction and quantity of the resultant (R) may then be determined, and hence the center of pressure is known.

In accordance with the requirements of the patent statues I have set forth one complete embodiment of my improvements, but it is understood that the claims annexed hereto are to be construed in the light of the spirit of these improvements, and are not to be limited to the specific devices shown and disclosed, except as is rendered necessary by specific recitation therein or by a consideration of the prior art.

I claim:

1. A wind tunnel balance comprising a pair of rigidly connected cross arms with means for supporting either of said cross arms and permitting the other cross arm to oscillate about the first cross arm as an axis.

2. A wind tunnel balance comprising a pair of rigidly connected cross arms, said cross arms crossing each other at right angles, a means for supporting either of said arms and thereby the balance for oscillation thereabout, and permitting the other of said arms to act as a balance and oscillate about the first said arm as an axis, and means carrying an aerofoil body for test carried by said balance.

3. A wind tunnel balance comprising a pair of rigidly connected cross arms said arms crossing each other at right angles, bearing supports for supporting either of said arms and causing it to serve as the axis of oscillation of the balance, an aerofoil body support carried by said balance and rotatably mounted thereon, and a balance connected with said aerofoil support whereby the moment of said support on the cross arm may be measured.

4. A wind tunnel balance comprising two sets of bearings about which the balance may oscillate, the arrangement being such that the oscillation about one set of bearings as an axis is at right angles to the oscillation of the balance about the other set, an aerofoil body support carried by said balance and adapted to be either fixed thereto or rotatably mounted thereon, and an auxiliary balance in connection with said aerofoil body support for determining its oscillation with reference to the main body.

5. In aerodynamic testing apparatus, the combination of a wind tunnel, with a balance carried thereby and having an aerofoil support extending into said tunnel, said balance comprising two sets of supports carried by the wind tunnel casing, a pair of cross arms at right angles to each other co-operating with said two sets of supports, either of said cross arms being adapted to be pivotally mounted upon its bearing support for oscillation thereabout as an axis, and a means for adjusting the aerofoil support with reference to the cross arms for the purpose set forth.

6. In an aerodynamic testing apparatus, the combination of a wind tunnel, with a balance carried thereby comprising an aerofoil support extending upwardly into said tunnel, two sets of bearing supports depending from said tunnel and a pair of cross arms serving as balance supports which cooperate with said sets of bearing supports, means adjustably mounting said aerofoil support with reference to the cross arm balances, a means pivotally mounting said aerofoil support, and a balance interposed in the last mentioned means for the purpose set forth.

7. A wind tunnel balance comprising two sets of oppositely disposed knife bearing supports, a pair of cross arms adapted to be either supported by said bearings or to oscillate freely therefrom, a main aerofoil support connecting with said cross arms and adjustably mounted thereon, a spindle for directly supporting said aerofoil and pivotally carried by the first mentioned support for rotation about itself as an axis, and a balance for measuring the moment of said spindle.

8. A wind tunnel balance comprising a pair of rigidly connected oscillatable cross arms together with means for supporting either cross arm against oscillation and permitting the other cross arm to oscillate.

In testimony whereof I hereunto affix my signature.

ALBERT F. ZAHM.